(12) United States Patent
Owens

(10) Patent No.: US 9,187,705 B2
(45) Date of Patent: Nov. 17, 2015

(54) EASY LIGHTING CHARCOAL BRIQUETTES WITH WOOD SHAVINGS

(71) Applicant: Edward F. Owens, Ellicott City, MD (US)

(72) Inventor: Edward F. Owens, Ellicott City, MD (US)

(*) Notice: Subject to any disclaimer, the term of this patent is extended or adjusted under 35 U.S.C. 154(b) by 223 days.

(21) Appl. No.: 14/018,632

(22) Filed: Sep. 5, 2013

(65) Prior Publication Data
US 2014/0060343 A1  Mar. 6, 2014

Related U.S. Application Data

(60) Provisional application No. 61/696,893, filed on Sep. 5, 2012.

(51) Int. Cl.
*C10L 11/04* (2006.01)
*A47J 37/07* (2006.01)
*C10L 11/06* (2006.01)

(52) U.S. Cl.
CPC ............ *C10L 11/04* (2013.01); *A47J 37/0768* (2013.01); *C10L 11/06* (2013.01)

(58) Field of Classification Search
CPC .... A23B 4/044; A47J 37/0768; A47J 37/079; A47J 36/022; A47J 37/0704; B65D 2581/3416; B65D 31/00; B65D 77/003; B65D 77/0433; B65D 81/3407; C10L 11/04; C10L 11/06

USPC ............ 44/541; 65/374.15; 99/482, 467, 150, 99/455; 110/102; 126/59; 431/6; 493/47

See application file for complete search history.

(56) References Cited

U.S. PATENT DOCUMENTS

| | | | | |
|---|---|---|---|---|
| 2,799,563 | A | * | 7/1957 | Shenker ........................ 44/541 |
| 3,385,282 | A | * | 5/1968 | Lloyd ............................ 44/522 |
| 4,821,419 | A | * | 4/1989 | Lee .................................. 30/493 |
| 5,296,004 | A | * | 3/1994 | Johnson et al. ................ 44/545 |
| 6,508,849 | B1 | * | 1/2003 | Comas ............................ 44/543 |
| 2009/0007826 | A1 | * | 1/2009 | Wares et al. ................... 110/233 |

* cited by examiner

*Primary Examiner* — Cephia D Toomer
(74) *Attorney, Agent, or Firm* — Polster, Lieder, Woodruff & Lucchesi, L.C.

(57) ABSTRACT

A fire starter for use with a grill (G) for cooking foods includes a combustible bag (A) placed on the grill. The bag's contents include charcoal (B) which, when lit, has a relatively long burn time. Interspersed in the bag with the charcoal are wood shavings (S) which have a shorter burn time than the charcoal. In one embodiment, the contents of the bag are poured into the grill. In another embodiment, one end (E1) of the bag is opened and placed on a grate (P). The other, upper end (E2) of the bag is opened and the lower end of the bag ignited. Setting the bag vertically produces a chimney effect that facilitates burning of the bag and its contents. When the bag is ignited, the shavings are also ignited and burn for a period sufficiently long to ignite the charcoal before being consumed.

13 Claims, 6 Drawing Sheets

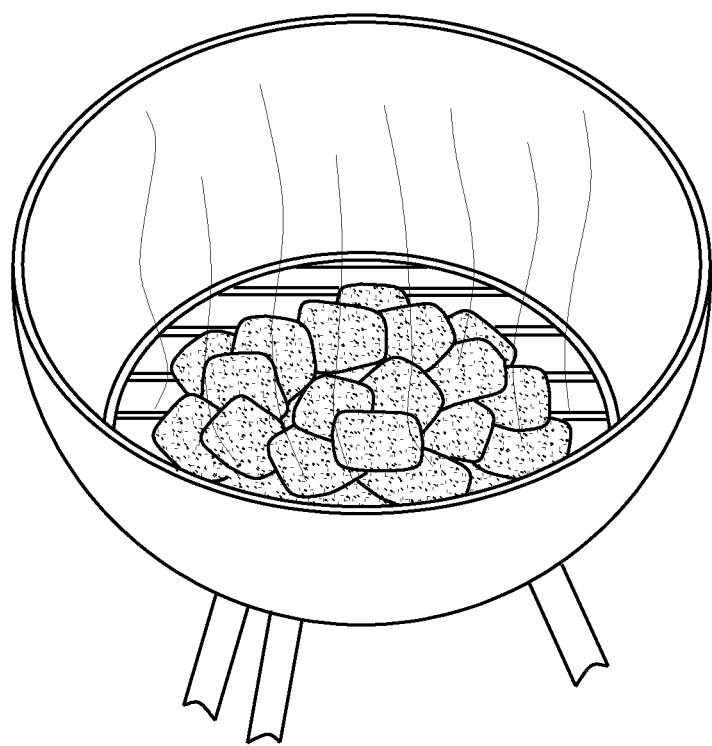
F I G . 4

EASY LIGHTING CHARCOAL BRIQUETTES WITH WOOD SHAVINGS

CROSS REFERENCE TO RELATED APPLICATIONS

This application is related to and claims the benefit of U.S. provisional patent application 61/696,893 filed Sep. 5, 2012, which is hereby incorporated by reference.

STATEMENT REGARDING FEDERALLY SPONSORED RESEARCH OR DEVELOPMENT

N/A

BACKGROUND OF THE INVENTION

This invention relates to cooking foods on a charcoal grill or the like; and, more particularly, to an improved way of adding large thick, dry wood shavings or chips mixed in with lump charcoal or charcoal briquettes as a way to ignite the charcoal.

As is well-known in the culinary arts, grilling food such as hamburgers, hot dogs, brats of various types, steaks, vegetables, etc., begins with someone placing charcoal briquettes in the bottom of a grill or fire pit and then igniting them. Once the charcoal is ignited and allowed to burn to a certain point (which varies according to who is doing the grilling and what is being grilled), the food is placed on a grill and cooked using the heat directed upward from the burning charcoal. Most charcoal is ignited ("started") using a flammable chemical (petroleum based) solvent. This "starter fluid" is either sprayed or poured onto to the charcoal and lit by applying a match or flame from a torch to the saturated briquettes. Alternately, a manufacturer will sell bags of charcoal marketed as a self-lighting charcoal; as, for example, Kingsford® Match Light® charcoal. Now, instead of spraying or pouring a starter fluid on the briquettes, the user simply applies a match to the charcoal to ignite it. Finally, in some instances other forms of lighting charcoal or used. These include, for example, grills that have an electric ignition or charcoal chimneys in which the briquettes are placed so to concentrate the heat of combustion.

Use of starter fluids and the like present certain hazards both to the person doing the lighting and those around them. Sprayed or poured fuel can inadvertently get on one's body or clothing and be inadvertently ignited causing someone to be burned. In other instances the fluid can get on flammable materials (e.g., paper plates, cups, napkins) in areas close to the grill and inadvertently set on fire. Another potential cause of harm occurs when the starter fluid is sprayed on an existing fire because someone does not believe the charcoal has been sufficiently lit, or if self-lighting charcoal is added to replenish the charcoal in the grill that has burned down to a level insufficient to cook food. In this regard it will be noted that it is not recommended to add self-lighting charcoal to an existing fire because the fire can jump up and spread to the bag, igniting fumes in the bag (or solvent remaining in the bag or on the user's hands) and causing serious injury.

In addition to these potential hazards, solvents produce volatile organic compound (VOC) emissions and can also add a disagreeable flavor to foods if the VOCs have not totally burned off before cooking is started.

As regards solvents added to the charcoal during manufacture of self-lighting charcoal, these tend to evaporate over time and affect the self-lighting capability of the charcoal, either reducing this capability or eliminating it altogether. Also, solvent emissions from self-lighting charcoal may necessitate the use of special, high cost barrier bags in which the product is sold, so to reduce or prevent the evaporation of solvents.

This invention described herein has significant advantages over all of these current methods.

BRIEF SUMMARY OF THE INVENTION

The present disclosure is directed to a combustible mixture of wood shavings and charcoal briquettes interspersed in a bag. In one embodiment, the mixture of charcoal and wood shavings is poured from the bag into the bottom of a grill or fire pit where food is cooked. The wood shavings are relatively large and are provided in a sufficient quantity that after the mixture is ignited, when the shavings are essentially consumed, the charcoal is burning and has substantially reached a temperature sufficient to cook food placed on the grill or over the pit. For this purpose, the shavings have a relatively thick center section and taper toward each side. This both promotes combustion of the shavings, and also prolonged burning.

In another embodiment, the bag is a combustible bag sized to fit into the bottom of the grill or pit. The combustible bag is readily ignited and does not require any solvents or other combustible materials to be used in order to start the bag burning. Again, the wood shavings are provided in a quantity sufficient that after the bag is ignited, and when the bag and wood shavings are essentially consumed, the charcoal is burning and has substantially reached a temperature sufficient to cook food placed on the grill or over the pit.

The wood used in the mixture can be one or more selected woods and is chosen to produce a pleasurable odor when burning.

The cost of the wood shavings included in the mixture represents a cost reduction over bagged charcoal which is infused with petroleum based solvents. The mixture also does not generate noxious odors when ignited, does not undesirably add chemical flavors to foods cooked on the grill and does not produce the pollution which occurs when solvents burn. After the food is cooked and the charcoal has been consumed, the resulting ash is readily disposed of so to not endanger the environment.

The bags in which the mixture is sold are available in a range of sizes for the convenience of users.

In addition to being available in individual bags, the product is also available in a disposable grill assembly which includes everything needed for grilling.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 4 is an illustration of the charcoal ready for cooking food on the grill; and, FIG. 5 is a perspective view of a wood shaving as used with the charcoal.

Corresponding reference characters indicate corresponding parts throughout the several views of the drawings.

DETAILED DESCRIPTION OF INVENTION

Figure 1A:
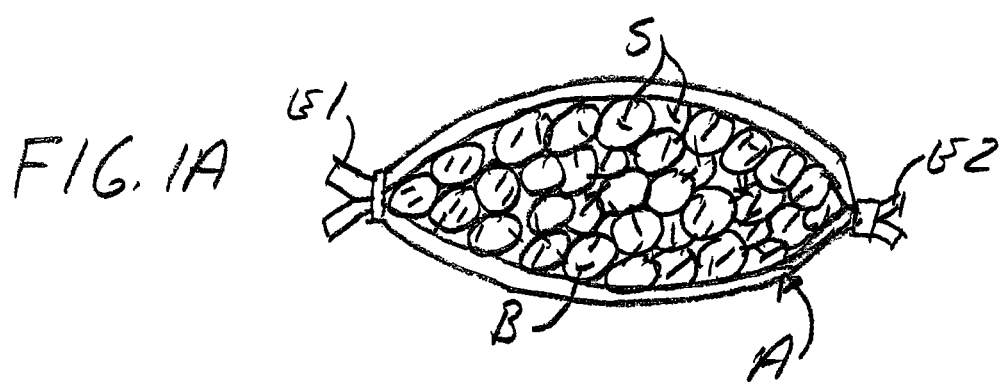
FIG. 1A is a sectional view of a bag holding a combustible mixture of wood shavings and charcoal briquettes.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to the drawings, a grill G for cooking or barbecuing food has a bowl shaped base section C supported by legs L. The bowl defines a pit in which combustible materials are placed and ignited with the resulting heat cooking food placed on the grill. A grate P of known construction is set in the bottom of the bowl. An air space is defined between the plate and the side and bottom of section C for air circulation through the grill. A generally circular grill plate (not shown) of known construction is supported at the upper, open end of the bowl and food to be cooked is placed upon the grill plate.

A bag A, which may be made of a combustible material, contains a first combustible material which is, for example, charcoal, typically in the form of briquettes B that, when ignited, burn for a relatively long time. A second combustible material is, for example, wood shavings S which are mixed in with and interspersed with the briquettes throughout the bag. While the shavings burn for a relatively short period of time, they are, as described hereafter, formed so that they burn sufficiently long that by the time they are consumed, the charcoal briquettes are burning. Also because of their size and shape, the wood shavings remain substantially in place within bag A and do not gravitate toward the bottom of the bag both when the bag is stored for long periods, and when the bag is set on end in the bottom of a grill or pit. Rather, the shavings remain generally uniformly intermixed with the charcoal throughout the bag.

The briquettes are of a common size similar to that currently found in commercially sold bags of charcoal briquettes.

Referring to FIG. 5, shavings S are large size shavings typically between 1-3" long and 1.5" wide. The shavings are cut so to have a center thickness of, for example, between 0.020" and 0.125". The shavings are tapered or feathered toward each side F1, F2 of a shaving. This thin edge makes it easier for the shavings to ignite; while, the thicker center of the shavings promotes a sufficiently long burn time that helps shavings ignite the briquettes around them before the shavings are consumed. The wood used to make the shavings is a dry wood, having a moisture content ranging, for example, from between approximately 4-14%. The shavings are also made from different types of wood, pine being the preferred wood. The shavings produce very little ash when they are consumed.

Figure 1B:
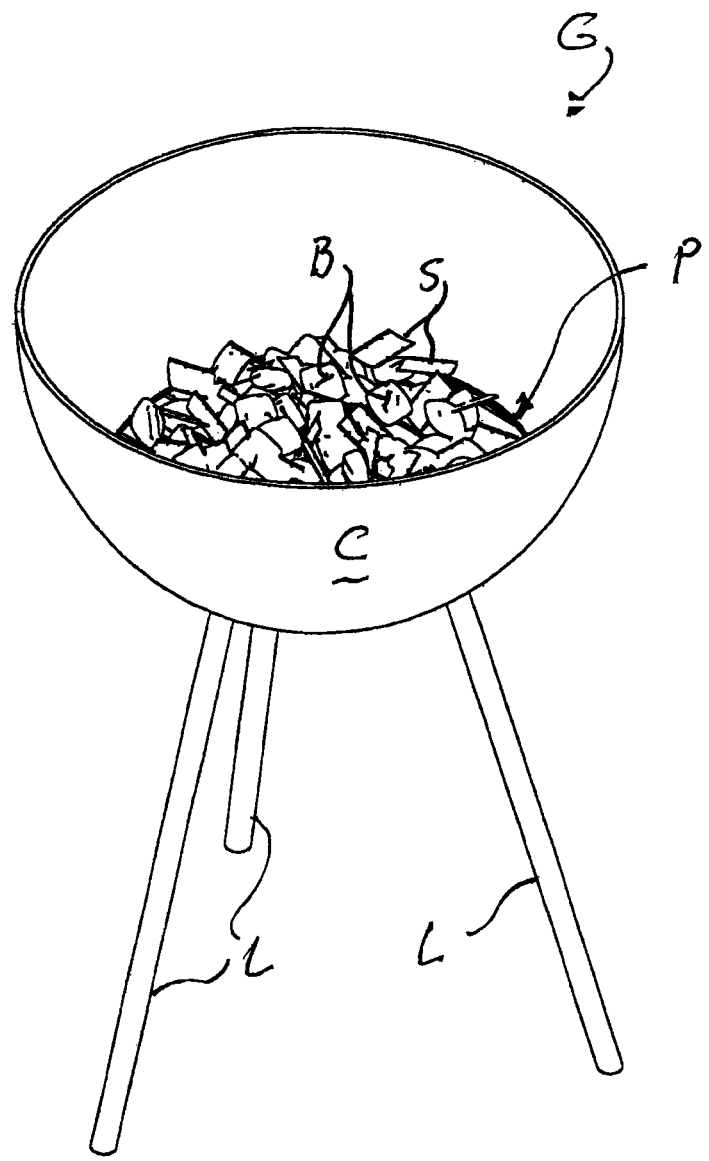
FIG. 1B shows the contents of the bag poured into a grill prior to lighting.

During the manufacture of bag A, and as shown in FIG. 1A, when the bag is filled, the shavings are interspersed with the charcoal briquettes. In one embodiment of the invention, when food is to be cooked on a grill or over a fire pit, one end of bag A is opened and the contents are poured into the bottom of the grill or pit as shown in FIG. 1B. In doing so, the briquettes and wood shavings remain interspersed such as they were in the bag. The user then ignites the wood shavings. As the shavings are consumed, the heat they produce ignites the charcoal briquettes around them.

Figure 1C:
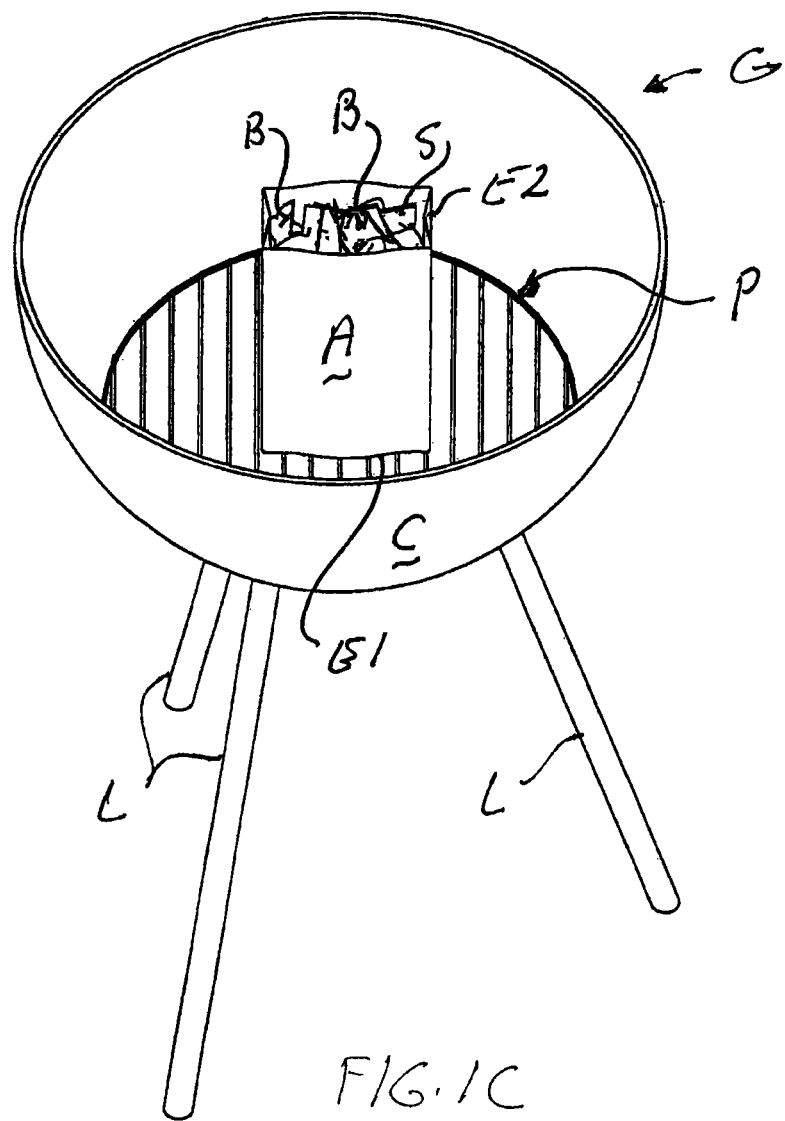
FIG. 1C illustrates the bag placed on end in a grill prior to igniting the bag and its' contents.

In a second embodiment of the invention shown in FIG. 1C, bag A, which is a single use bag made of a combustible material, is consumed together with its contents. Now, bag A is placed in the bottom of the grill or pit and set vertically on end. Before igniting the bag, the user opens both ends E1, E2 of the bag. That is, the user first opens one end E1 of bag A and places this open end down on grate P. Next, the top end E2 of the bag is opened. This vertical placement of bag A with both ends open creates a chimney effect which facilitates burning of the bag and its contents. This arrangement of bag A also stacks the charcoal briquettes in the bag without the user having to handle the charcoal and getting their hands dirty. Besides keeping the user from getting dirty, bag A provides an easy to use package for the charcoal and wood shavings that lights quickly and easily.

The wood shavings S at bottom end E1 of bag A are ignited when the bottom of the bag is set on fire using a match or torch. The fire then spreads up the sides of the bag and together with the shavings burning in the lower end of the bag start to ignite the shavings further up in the bag. The burning shavings generate enough heat to ignite the charcoal briquettes.

In a further embodiment of the invention, the wood shavings are treated with an oil or wax coating. The coating may be a vegetable based or a petroleum based oil, and the wax may be a vegetable based wax or a petroleum based wax.

Figure 2:
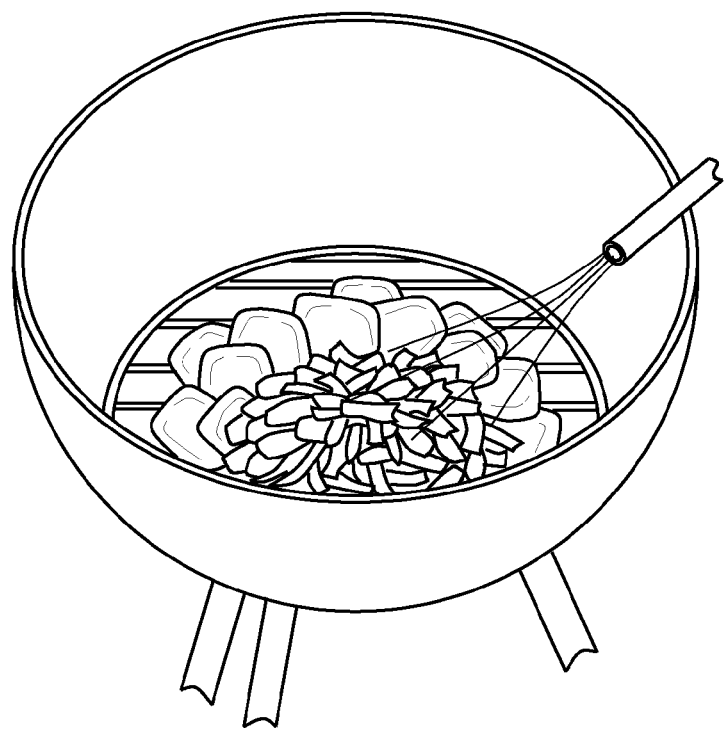
FIG. 2 is an illustration of the charcoal and wood shavings when the shavings are being lighted.
Figure 3:
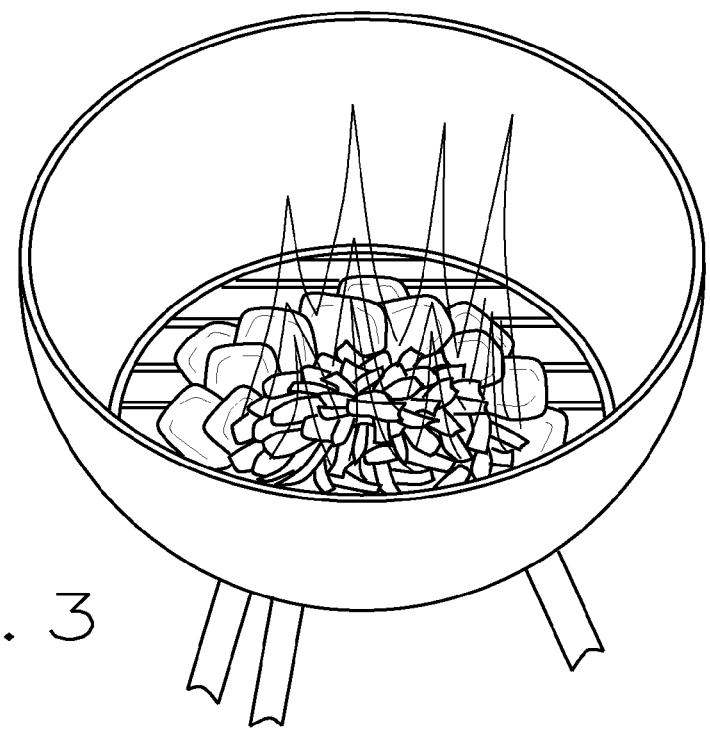
FIG. 3 is an illustration of the charcoal and shavings after they are lit.

After the charcoal is lit, it burns in the traditional manner as shown in the illustrations of FIGS. 2-4. FIG. 2 illustrates lighting of the charcoal and shavings; FIG. 3, burning of the lit charcoal; and, FIG. 4 the briquettes as heated in order to cook food placed on the grill.

The invention, as described above, has many advantages over current methods for lighting charcoal in a grill. First, bag A includes everything needed in a single bag to start the charcoal on fire and cook food once the charcoal is burning. Next, the wood shavings used in the bag are made from a natural, renewable material that is better for the environment than traditional fuel starters. Third, compared to the other bags of self-lighting charcoal, the contents of bag A are naturally derived, safer, and more environmentally friendly. Further, the bag and its contents are relatively inexpensive, clean to use, suffer little shipping damage, and have a long shelf or open bag life without becoming unusable due to evaporation of solvents.

Finally, although not shown in the drawings, a disposable grill may include the briquettes and wood shavings either by themselves, or in a bag. Now, when the package in which the grill is sold is removed, all the user needs to do is ignite the wood shavings or the bag in which the shavings and briquettes are contained. After the cooking is finished and the remains of ash from the wood and briquettes have safely cooled, the grill and the remains are safely disposed of in an appropriate container.

In view of the above, it will be seen that the several objects and advantages of the present disclosure have been achieved and other advantageous results have been obtained.

Having thus described the invention, what is claimed and desired to be secured by Letters Patent is:

1. A fire starter for use with a grill used to cook food placed thereon, the fire starter comprising:

a first combustible material which, when lit, has a first burn time and a second combustible material which, when lit, has a second burn time which is shorter than the burn time of the first combustible material; and, the first combustible material comprising a plurality of charcoal briquettes and the second combustible material comprising a plurality of wood shavings interspersed with the charcoal briquettes, each wood shaving having a middle portion which is thicker than outer ends thereof for each wood shaving to taper in size from its middle portion to its sides whereby each wood shaving has thin ends which readily ignite so to ignite the wood shaving on fire with the middle, thicker portion of the wood shaving producing a burn time which is long enough so as to ignite the charcoal briquettes surrounding the wood shaving before the wood shaving is consumed by fire.

2. The fire starter of claim 1 further including a bag in which said combustible materials are contained, the materials being interspersed in the bag.

3. The fire starter of claim 2 in which the bag is a combustible bag which, when burning, ignites the combustible materials in the bag.

4. The fire starter of claim 3 in which the bag is sat on end with each end of the bag being opened so to create a chimney effect when the bag is set on end and ignited, thereby promoting burning of the combustible materials in the bag.

5. The fire starter of claim 1 in which the wood shavings are treated with one of a vegetable based oil or a petroleum based oil.

6. The fire starter of claim 1 in which the wood shavings are coated with one of a vegetable based wax or a petroleum based wax.

7. The fire starter of claim 1 in which the wood shavings are made of pine.

8. A fire starter for use with a grill used to cook food placed thereon, the fire starter comprising:

a plurality of first combustible materials which, when lit, have a first burn time;

a plurality of second combustible materials which, when lit, have a second burn time that is shorter than that of the first combustible materials;

a bag in which said combustible materials are contained, the materials being interspersed in the bag, the first and second combustible materials, when poured from the bag onto the grill being interspersed with each other, the burn time of the second combustible materials being long enough so that they ignite the first combustible materials before being consumed, with the heat from the first combustible materials then cooking food placed on the grill; and, the first combustible material comprising a plurality of charcoal briquettes and the second combustible material comprising a plurality of wood shavings interspersed with the charcoal briquettes, each wood shaving having a middle portion which is thicker than outer ends thereof for each wood shaving to taper in size from its middle portion to its sides whereby each wood shaving has thin ends which readily ignite so to ignite the wood shaving on fire with the middle, thicker portion of the wood shaving producing a burn time which is long enough so as to ignite the charcoal briquettes surrounding the wood shaving before the wood shaving is consumed by fire.

9. The fire starter of claim 8 in which the bag is a combustible bag which is placed on the grill and in which the combustible materials are contained when the bag is placed thereon, the bag then being ignited and, when burning, igniting the combustible materials contained therein.

10. The fire starter of claim 9 in which the bag is sat on end with each end of the bag being opened so to create a chimney effect when the bag is set on end and ignited, thereby promoting burning of the combustible materials in the bag.

11. The fire starter of claim 8 in which the wood shavings are treated with one of a vegetable based oil or a petroleum based oil.

12. The fire starter of claim 8 in which the wood shavings are coated with a one of a vegetable based wax or a petroleum based wax.

13. The fire starter of claim 8 in which the wood shavings are made of pine.

* * * * *